(12) United States Patent
Thyroff

(10) Patent No.: US 10,235,865 B2
(45) Date of Patent: Mar. 19, 2019

(54) SYSTEM AND METHOD FOR MONITORING HANDWASHING COMPLIANCE

(71) Applicant: Hand Scan LLC, Pittsford, NY (US)

(72) Inventor: Louis Thyroff, Pittsford, NY (US)

(73) Assignee: Hand Scan LLC, Pittsford, NY (US)

( * ) Notice: Subject to any disclaimer, the term of this patent is extended or adjusted under 35 U.S.C. 154(b) by 0 days.

(21) Appl. No.: 15/443,081

(22) Filed: Feb. 27, 2017

(65) Prior Publication Data

US 2017/0294106 A1    Oct. 12, 2017

Related U.S. Application Data

(60) Provisional application No. 62/320,056, filed on Apr. 8, 2016.

(51) Int. Cl.
*A61B 5/00* (2006.01)
*A61B 5/11* (2006.01)
(Continued)

(52) U.S. Cl.
CPC ............ *G08B 21/245* (2013.01); *E03C 1/057* (2013.01); *G06F 3/167* (2013.01); *G10L 17/005* (2013.01); *G10L 17/22* (2013.01); *A47K 2210/00* (2013.01)

(58) Field of Classification Search
CPC .............. A61B 5/0261; G06F 19/3418; G08B 21/0484; G08B 21/0492; G08B 21/245; H04M 2250/12; G05D 1/0242
(Continued)

(56) References Cited

U.S. PATENT DOCUMENTS 5,793,653 A    8/1998 Segal
5,812,059 A    9/1998 Shaw et al.
(Continued)

FOREIGN PATENT DOCUMENTS

WO    WO2014035308 A1    3/2014
WO    WO2015055971 A1    4/2015

OTHER PUBLICATIONS

Claire Swedberg, "Technologies Solutions Group Markets RFID Hand-Hygiene Compliance System", http://www.rfidjournal.com/articles/view?11725, Published/accessed date: Apr. 25, 2014.
(Continued)

*Primary Examiner* — Emily C Terrell
(74) *Attorney, Agent, or Firm* — Dinsmore & Shohl LLP

(57) ABSTRACT

A hand-washing monitor and hand washing monitoring system are provided. The hand-washing monitoring system includes a motion detector mounted near, to or in a sink and configured to detect a scrubbing motion near a location of an outlet of a sink faucet. Both the hand-washing monitor and the hand-washing monitoring system include a processor coupled to the motion detector and a memory coupled to the processor. The processor is configured to monitor the motion detector for signals indicative of the scrubbing motion that is continuous during a predetermined scrubbing interval and to provide signal indicating a successful scrubbing operation when the scrubbing motion is continuously detected during the entire interval. The hand-washing monitor includes a housing containing the processor, the motion detector, the memory and proximity sensors for detecting the application of soap.

25 Claims, 12 Drawing Sheets

(51) Int. Cl.
*G06F 3/16* (2006.01)
*A61B 5/117* (2016.01)
*G08B 21/24* (2006.01)
*G10L 17/00* (2013.01)
*G10L 17/22* (2013.01)
*E03C 1/05* (2006.01)

(58) Field of Classification Search
USPC ................ 340/539.1, 539.12, 539.11–539.19
See application file for complete search history.

(56) References Cited

U.S. PATENT DOCUMENTS

| | | | | |
|---|---|---|---|---|
| 5,966,753 | A * | 10/1999 | Gauthier | A47K 5/12 |
| | | | | 4/623 |
| 5,979,500 | A * | 11/1999 | Jahrling | E03C 1/057 |
| | | | | 137/624.12 |
| 6,125,482 | A * | 10/2000 | Foster | E03C 1/046 |
| | | | | 4/623 |
| 7,551,092 | B1 | 6/2009 | Henry | |
| 7,804,409 | B2 | 9/2010 | Munro et al. | |
| 8,400,309 | B2 | 3/2013 | Glenn et al. | |
| 8,525,666 | B2 | 9/2013 | Melker et al. | |
| 9,013,312 | B2 | 4/2015 | Bolling | |
| 9,030,325 | B2 | 5/2015 | Taneff | |
| 9,715,817 | B2 | 7/2017 | Wildman et al. | |
| 2001/0018654 | A1 * | 8/2001 | Hon | G10L 15/08 |
| | | | | 704/257 |
| 2007/0020212 | A1 * | 1/2007 | Bernal | G08B 21/245 |
| | | | | 424/70.1 |
| 2008/0103636 | A1 | 5/2008 | Glenn et al. | |
| 2008/0109956 | A1 * | 5/2008 | Bayley | E03C 1/057 |
| | | | | 4/623 |
| 2008/0271238 | A1 * | 11/2008 | Reeder | A46B 7/04 |
| | | | | 4/597 |
| 2010/0134296 | A1 | 6/2010 | Hwang | |
| 2010/0207767 | A1 | 8/2010 | Verdiramo | |
| 2011/0316703 | A1 | 12/2011 | Butler et al. | |
| 2013/0027199 | A1 * | 1/2013 | Bonner | G08B 21/24 |
| | | | | 340/539.11 |
| 2014/0242562 | A1 * | 8/2014 | McSterling | G08B 21/245 |
| | | | | 434/257 |
| 2015/0077258 | A1 | 3/2015 | Nelson et al. | |
| 2015/0127365 | A1 | 5/2015 | Rizvi et al. | |
| 2015/0161874 | A1 | 6/2015 | Thyroff et al. | |
| 2015/0194043 | A1 | 7/2015 | Dunn et al. | |
| 2016/0314683 | A1 * | 10/2016 | Felch | G08B 21/245 |

OTHER PUBLICATIONS

International Search Report and Written Opinion relating to International Application No. PCT/US/2017/055893 dated Apr. 26, 2018.

* cited by examiner

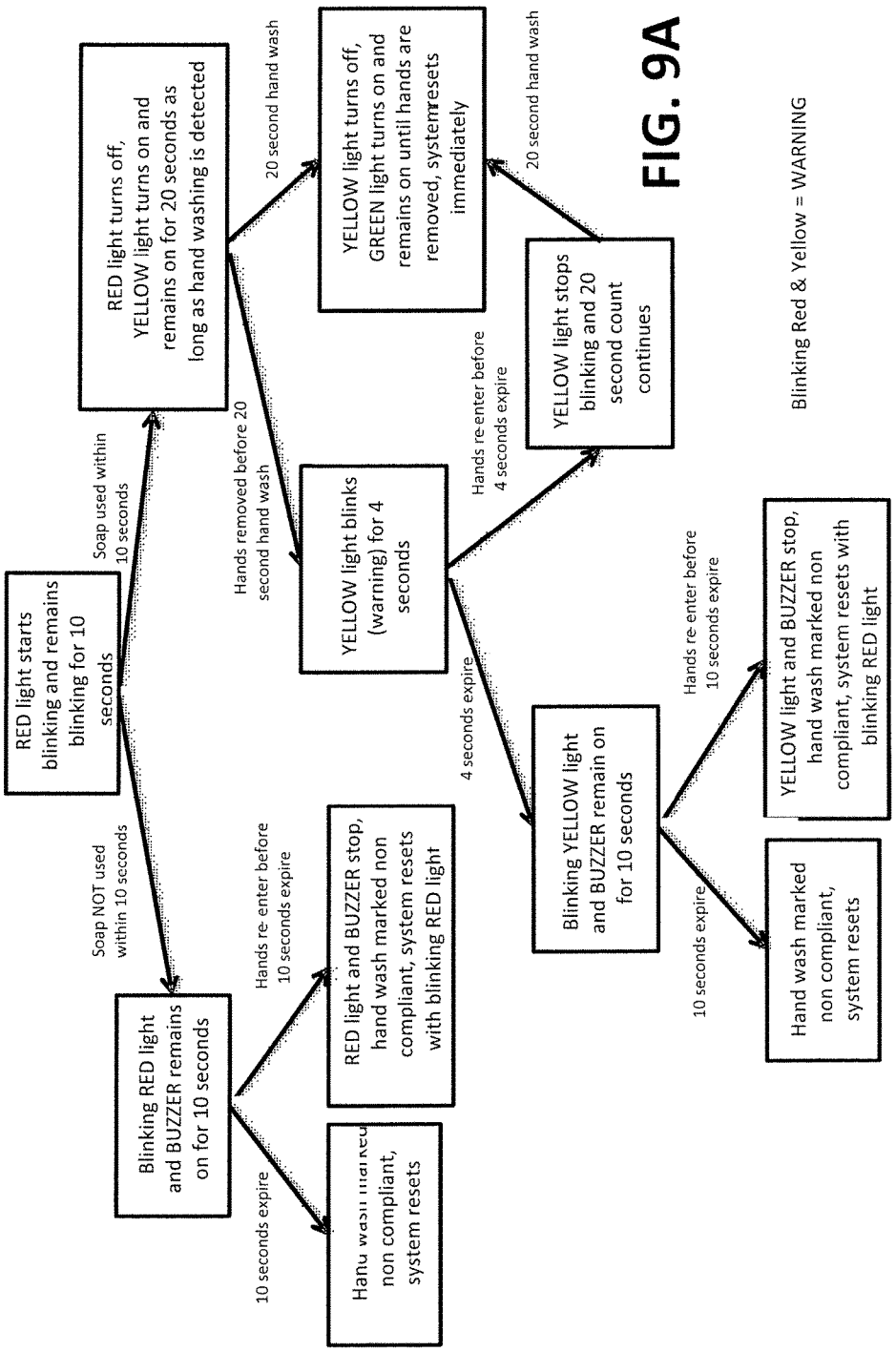

SYSTEM AND METHOD FOR MONITORING HANDWASHING COMPLIANCE

CROSS-REFERENCE TO RELATED APPLICATION

This application claims priority of U.S. Provisional Patent Application No. 62/320,056, filed on Apr. 8, 2016 and entitled "SYSTEM AND METHOD FOR MONITORING HANDWASHING COMPLIANCE," the entire contents of which are incorporated herein by reference.

BACKGROUND

Hospitals, restaurants and food manufacturing facilities all rely on the cleanliness of their employees. Many states have regulations concerning proper hand-washing procedures to minimize the danger infection and the transmission of pathogens. In spite of these regulations, however, there have been many reports of infections and illness caused by poorly washed hands.

SUMMARY

An example of a hand-washing monitoring system includes a motion detector mounted proximate to the top of a sink and configured to detect a scrubbing motion at a location near an outlet of a faucet of the sink. The system includes a processor coupled to the motion detector and a memory coupled to the processor. The processor is configured to monitor the motion detector for signals indicative of the scrubbing motion that is continuous during a predetermined scrubbing interval and to provide signal indicating a successful scrubbing operation when the scrubbing motion is continuously detected over the entire interval.

An example of a hand-washing monitoring system for use with a sink having a faucet and a soap dispenser is also provided. The hand-washing monitoring system including a motion detector, a proximity detector, one or more display devices, a processor and a memory storing program instructions. The motion detector is mounted to the sink. The motion detector is configured to detect a scrubbing motion in or above the sink and beneath an outlet of the faucet. The proximity detector is mounted proximate to the soap dispenser, and is configured to detect application of soap to an object. The processor is coupled to the motion detector, the proximity detector and the one or more display devices, and the memory. The memory including program instructions that when executed by the processor cause the processor to display, using one of the one or more of the display devices, a first prompt to place hands under the faucet. The processor monitors the motion detector for signals indicative of the presence of the hands beneath the faucet. Using one of the one or more display devices, the processor causes the display of a second prompt to apply soap to the hands. The processor monitors the proximity detector for signals indicative of the application of soap to the hands. The processor, using one of the one or more display devices, causes display of a third prompt to scrub hands. The processor monitors the motion detector for signals indicative of the scrubbing motion for a predetermined interval. The processor, using one of the one or more display devices, causes display of a fourth prompt to rinse the hands after the predetermined interval. The processor monitors the motion detector for the signals indicative of the presence of the hands beneath the faucet; and causes a fifth prompt to be displayed, using one of the one or more display devices, indicating completion of the hand washing.

BRIEF DESCRIPTION OF THE DRAWINGS

FIGS. 9A and 9B are flow-chart diagrams that describe examples of hand-washing operations where the worker rinses before applying soap and does not rinse before applying soap, respectively.

DETAILED DESCRIPTION

Most soaps do not kill bacteria, viruses or other potentially contaminating pathogens that food service and hospital workers may carry on their hands. Some soaps include antiseptic or anti-bacterial agents that are meant to kill these pathogens. These agents, however, may not kill all of the contaminants if a particular pathogen has developed a resistance to the agent or if the agent is not applied properly. In addition, the antiseptic and antibacterial agents rinsed from the worker's hands may affect the water supply of downstream users as they may not be completely removed by water treatment facilities.

Hand washing can be more effective at removing these pathogens and may also be more environmentally friendly. To effectively remove pathogens, it is desirable for workers to scrub their hands for an extended period in order to loosen the pathogens so that they may be removed by the rinse water. Vigorous scrubbing between 15 and 30 seconds is usually sufficient to loosen most or all contaminants. Anything less, many contaminants could still be present on hands.

An example system that ensures compliance with an effective hand-washing system monitors not only the presence of a worker's hands at a hand-washing station but also monitors hand motion to ensure that the worker's hands are sufficiently scrubbed. The example systems described below employ a motion detector mounted on, or proximate to a hand-washing station, such as a sink, to reliably detect vigorous hand-washing motion for a specific amount of time.

To ensure effective hand-washing, however, it may not be sufficient to monitor only the scrubbing motion. It is also desirable to ensure that soap or other cleaning agent was applied prior to the scrubbing operation and that the workers rinse and dry their hands before returning to work. In addition, a single hand washing operation may not cover an entire shift. To ensure cleanliness, it may be desirable for workers to periodically wash or to wash after certain activities, such as using the toilet.

The example systems may identify each worker as they begin to wash their hands and then monitor the hand-washing operation to ensure that it is effective. Both complete and incomplete hand-washing operations are recorded by the system and may be reported to a remote location to ensure compliance with any mandated procedures.

Figure 1:
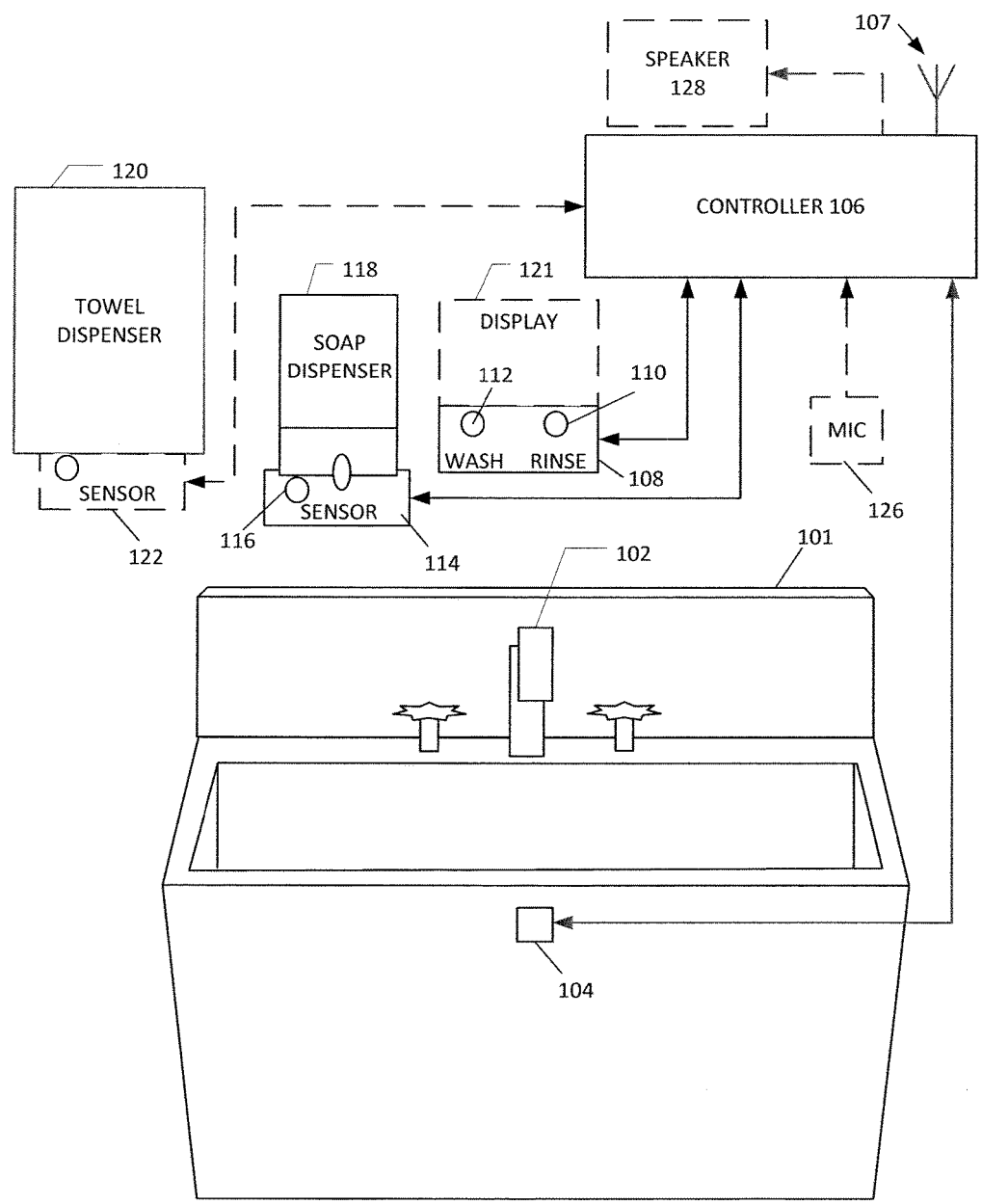
FIG. 1 is a block diagram, partly in perspective, of a sink in a food preparation establishment that includes a first example of a hand-washing monitoring system.

FIG. 1 is a block diagram, partly in perspective, of an example hand-washing station including an example monitoring system. The station includes a sink 100 having a backsplash 101 and a faucet 102. The sink also includes an example motion sensor 104, mounted through the front wall of the sink within a quarter of the front wall area extending down from the center of the top of the sink. Alternatively, the sensor 104 may be mounted on the top of the sink. The example sensor has a field of view into or above the sink, to detect a worker's hands located below the faucet 102. The motion sensor may be, for example, a pyroelectric infra-red (PIR) sensor. It is contemplated, however, that other types of sensors that can detect both heat and motion, such as an infra-red (IR) sensor may be used.

Although the sensor is shown as being mounted through the front of the sink, it is contemplated that it may be mounted in other locations, such as on top of the front of the sink, at the base of the faucet in back of the sink, or on the backsplash or wall behind the sink, as described below with reference to FIGS. 4C and 4D.

The sensor 104 provides signals indicating the presence or absence of hands and the presence or absence of scrubbing motion to a controller 106. The controller is also coupled to provide signals to a display 108, to transmit data to a remote location using an antenna 107, and to both provide signals to and receive signals from a soap dispenser sensor 114 located near a soap dispenser 118. As shown in FIG. 1, the controller may also be coupled to a towel dispenser sensor 122, located near a towel dispenser 120, a microphone 126, a speaker 128 and an optional screen-type display 121. These devices are shown in phantom as they are optional.

As described above, the example motion sensor 104 is mounted through a hole in the front of the sink 100 and is configured to sense motion in the sink and above the top of the sink but below the faucet. Although the example in FIG. 1 shows the sensor mounted in the sink, it is contemplated that, alternatively, the sensor 104 may be mounted on the top of the front edge of the sink, facing the faucet, or on the top of the back edge of the sink, facing the front of the sink, as described below with reference to FIGS. 4C and 4D.

PIR motion sensors are typically used to detect bodies moving through an area. Such uses include automatic on-off light switches and security system motion sensors. PIR sensors may also be used in automatic faucets, soap dispensers and towel dispensers to dispense water, soap and towels after detecting the presence of a user's hands. These sensors, however, merely detect the presence of the hands by their IR heat signature and/or just detect motion. They do not detect continuous scrubbing motion.

The motion sensor 104, shown in FIG. 1 has a greater range than motion sensors commonly used with automatic faucets and soap dispensers and a smaller range than security system sensors, as it detects heat and motion in an area below the faucet 102 and extending into the sink 100. Sensors having this intermediate range may also detect extraneous motion, such as a person walking past the front of the sink. This motion may be detected because the sink 100 and back splash 101 are made from stainless steel, which reflects IR radiation. The sensor 104 is adapted to reliably sense continuous scrubbing motion while ignoring extraneous motion.

Figure 8A:
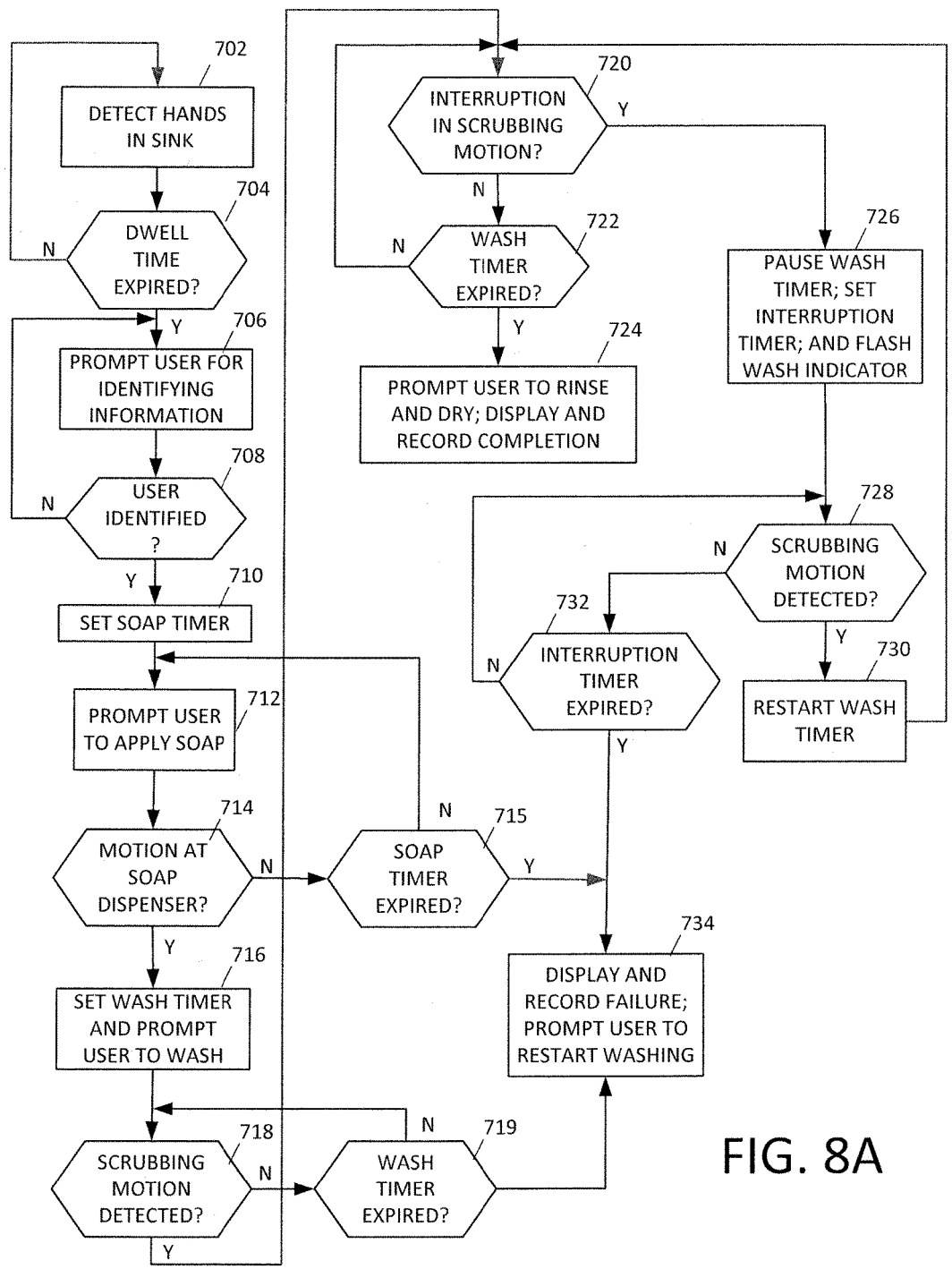
FIGS. 8A and 8B are flow-chart diagrams that are useful for describing the operation of the examples of the hand-washing monitoring systems such as those shown in FIGS. 1 and 7A.
Figure 8B:
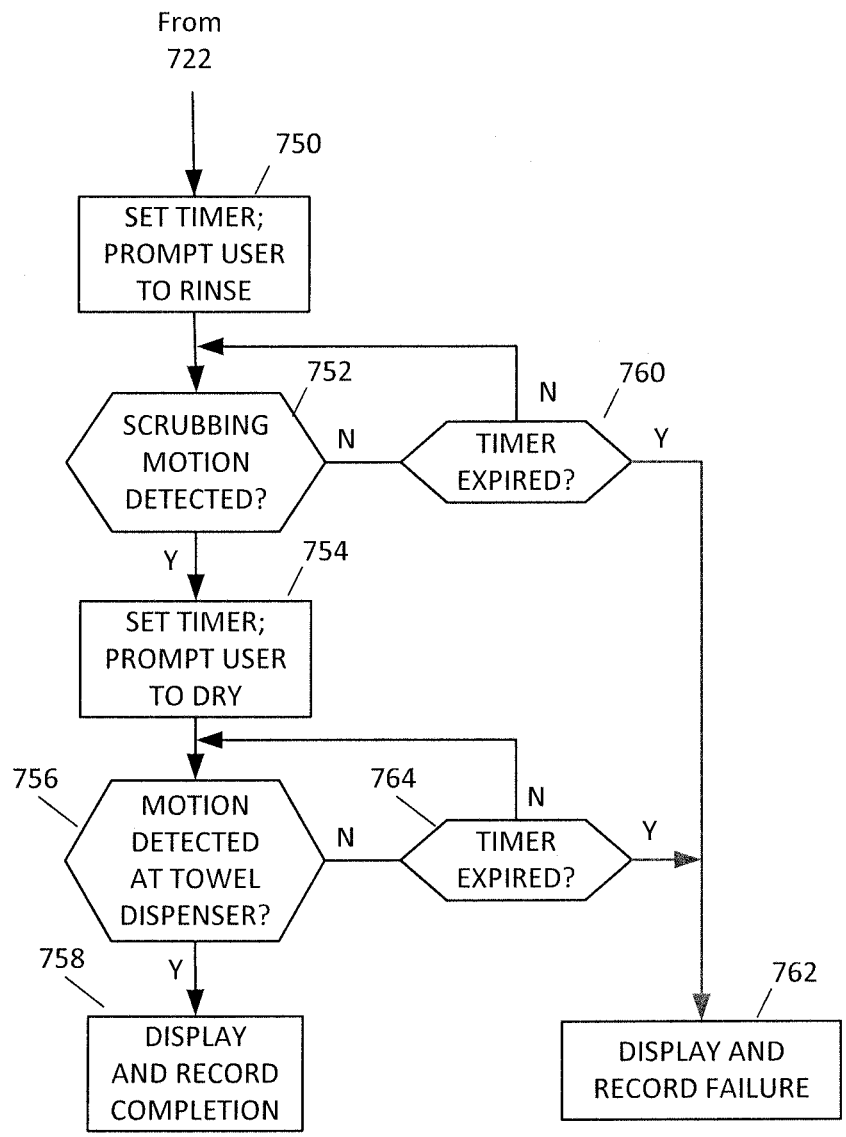
Figure 9B:
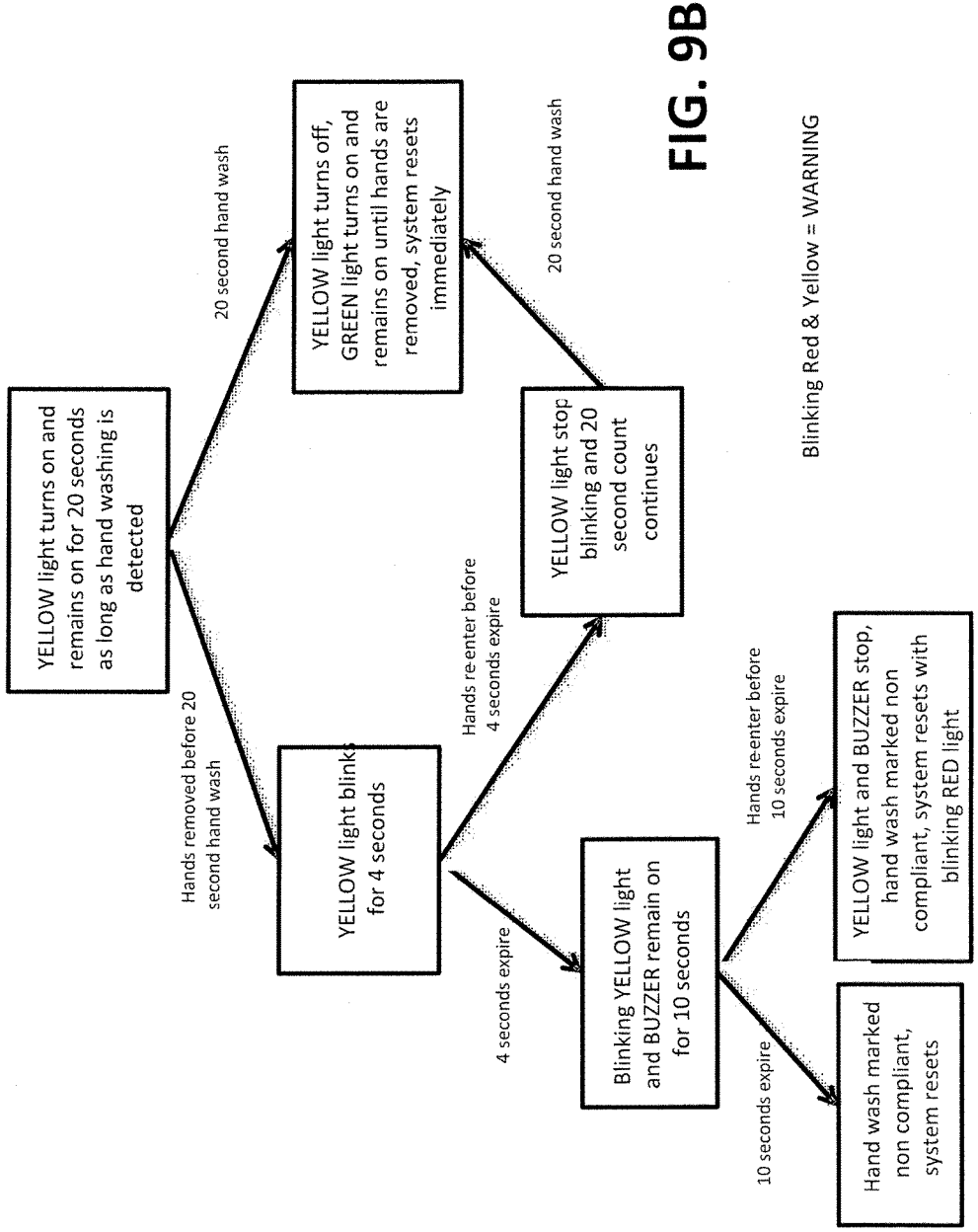

Each item of the example system shown in FIG. 1 is described below with reference to FIGS. 2-6 and the operation of the example system is described below with reference to FIGS. 8A and 8B and are shown in FIGS. 9A and 9B.

Figure 2:
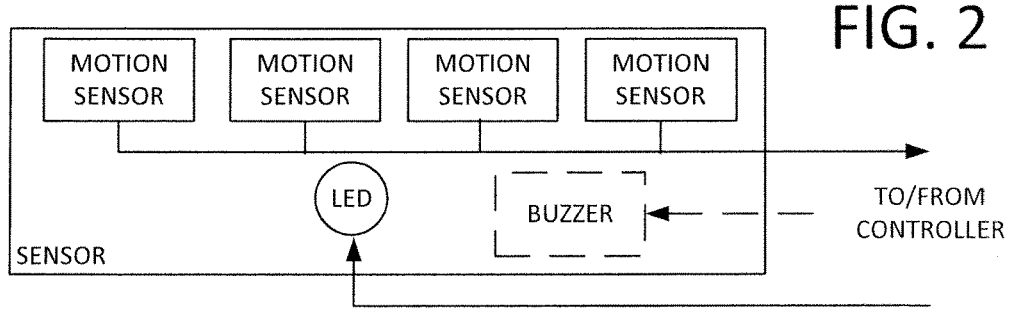
FIG. 2 is a block diagram of a sensor module suitable for use with the system shown in FIG. 1.

FIG. 2 is a block diagram of an example sensor suitable for use as the soap dispenser sensor 114 or towel dispenser sensor 122, shown in FIG. 1. The example sensor includes multiple motion sensors 202, a light-emitting diode (LED) 116 and an optional buzzer 204. The LED 116 may be a single color LED or a multi-color LED (e.g. red, green and yellow). When the controller 106 determines that it is time for the worker to use the soap dispenser or towel dispenser, it sends a signal to illuminate the LED 116 (e.g. yellow). When the signal provided by the motion sensor 202 to the controller 106 indicates motion proximate to the soap dispenser 114 or towel dispenser 120, the controller 106 records the dispensing of soap or a towel and turns off the LED 116 or changes the color of the LED, for example, to green. If no motion is detected during a preset interval after the LED is illuminated, the controller may sound the buzzer 204 and may cause the LED to flash and/or change the color of the LED, for example, to red.

The motion sensors 202 may be short-range include short-range motion and/or IR sensors such as the TMD2772 or TMD2772WA Ambient Light Sensor available from AMS AG, Tobelbaderstrasse 30, 8141 Premstaetten. Austria, These sensors include a range finder and may be configured to detect the presence of a hand within zero to five cm of the soap sensor 114 or within zero to 15 cm of the towel dispenser sensor 122. In one implementation, the soap dispenser sensor 114 may include one or two sensor elements while the towel dispenser sensor 122 may include between one and four sensor elements 202. The different numbers of sensor elements ensure coverage over the entire area beneath the respective sensors.

Figure 3:
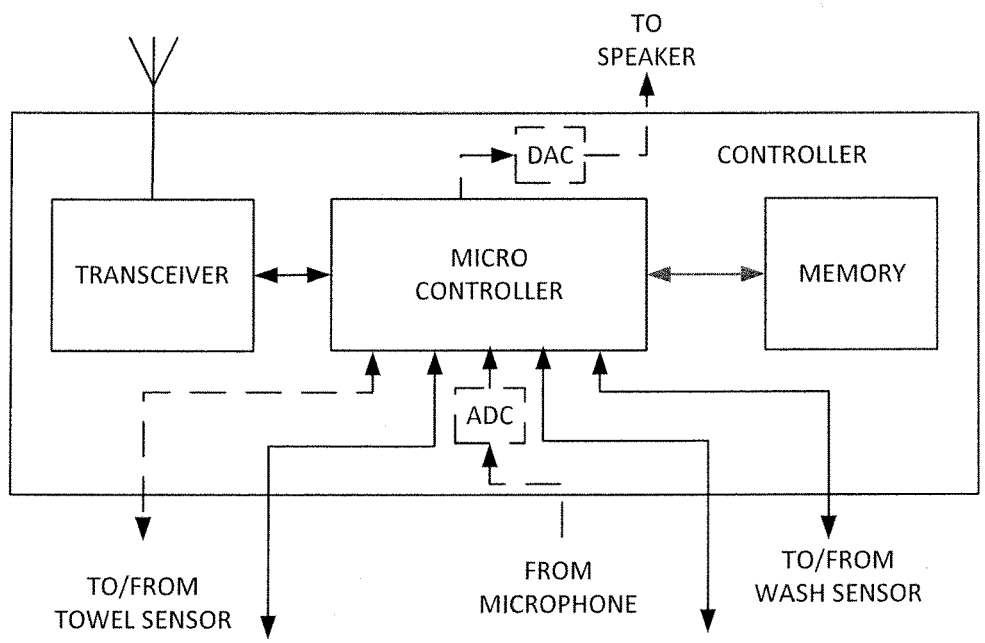
FIG. 3 is a block diagram of a controller module suitable for use with the system shown in FIG. 1.

FIG. 3 is a block diagram of a controller suitable for use as the controller 106, shown in FIG. 1. The example controller includes a microcontroller 302, memory 304 and short-range transceiver 306. The microcontroller 302 may be a microcontroller, a microprocessor or digital signal processor (DSP). Alternatively, the microcontroller 302 may be an application specific integrated circuit (ASIC), a complex programmable logic device (CPLD), or a field programmable gate array (FPGA) programmed to perform the functions shown in FIGS. 8A and 8B.

The short-range transceiver 306 may be, for example, a Wi-Fi IEEE 802.11 transceiver, a Bluetooth® transceiver, a Zigbee IEEE 802.15 transceiver or a cellular transceiver. The transceiver 306 may establish a wireless connection to a remote computer that receives hand-washing reports from the controller 106. The remote computer may also perform some of the functions described as being performed by the controller, such as voice recognition to identify the worker and the generation of reminders for each worker for multiple hand-washing procedures during the shift. Although the short-range transceiver 306 is shown as being wireless, it is contemplated that it may be implemented as a wired connection. In this instance the transceiver 306 may be an Ethernet network adapter coupled to the a wired network connection. In this example, the remote computer may also be connected to the network via a wired connection.

The controller 106 may also include an analog-to-digital converter 308 that digitizes signals provided by the optional microphone 126. The controller 106 may use these signals to perform a voice-recognition operation in order to identify the worker currently engaged in the hand-washing operation. Alternatively, the controller may digitize the signals provided by the microphone and send them to the remote computer to perform the voice-recognition operation.

Although the examples described below employ a display device such as one of the devices 108 and 121 to prompt the worker to perform the sequence of steps, it is contemplated that the system may be implemented with audio prompts provided by the optional speaker 128. The display devices such as 108 and 121 may be indicator lights, such as light emitting diodes or the like. When the speaker is used, the controller may generate digital audio signals, convert these signals to analog signals, using a digital to analog converter (DAC) 310, and send to the speaker 128.

Figure 4A:
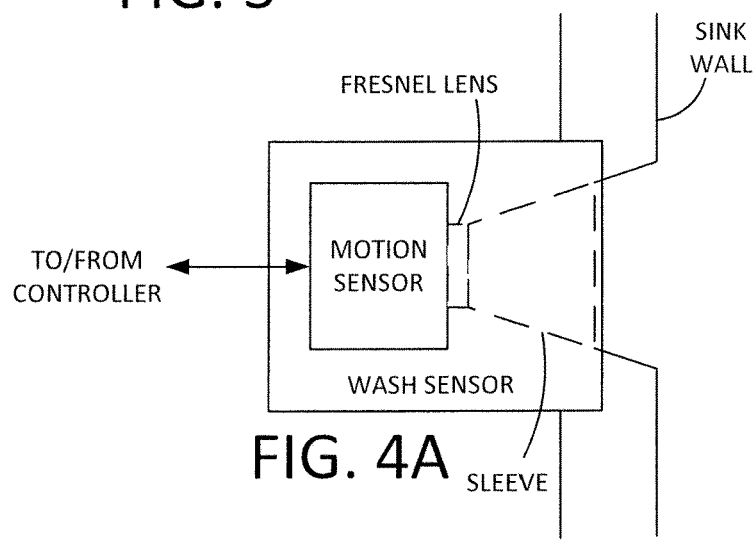
FIGS. 4A, 4B, 4C and 4D are block diagrams of sink sensors suitable for use with the system shown in FIG. 1.

FIGS. 4A-4D show example wash sensors that may be used to detect the presence of a worker's hands near, or, more specifically, in or above, the sink and to detect scrubbing motion when the hands are present. The wash sensor 104 includes a motion sensor 402, optional Fresnel lens 404 and optional sleeve 406. As shown in FIG. 4A, the wash sensor 104 is configured to be mounted in the front wall of the sink, pointing at an area near, such as in or above, the sink and below the faucet 102. The Fresnel lens focuses the IR radiation emitted by the worker's hands onto the pyroelectric sensor elements of the example motion sensor 402. The example motion sensor includes two pyroelectric elements horizontally spaced apart from each other. The motion of the scrubbing hands causes different levels of IR radiation to be focused on the different elements at different times. The wash sensor is configured to provide the amplified difference between the signals produced by the two sensors as the output signal. Thus, the detected scrubbing motion produces a time-varying output signal from the wash sensor 104.

The motion sensor 404 may be, for example, the DP-003B, digital pyroelectric motion detector, described above, and the Fresnel lens may be, for example, a FL35 Fresnel dome lens, which is available from Glolab Corp. Wappingers Falls N.Y. Alternatively, the sensor 404 may be the TMD2772 or TMD2772WA Ambient Light Sensor described above. The optional sleeve 406 reduces the field of view of the sensor 402 to remove extraneous IR signals, such as a person walking past the sink. When the TMD2772 or TMD2772WA sensors are used, the Fresnel lens and sleeve may not be needed. As an alternative to using the sleeve, it is contemplate that a portion of the front of the Fresnel lens may be covered, for example, with a painted ring so that only the center of the lens is exposed to light. This ring, may, for example, cover up to 40% of the lens surface.

The TMD2772 and TMD2772WA sensors each includes both an IR LED and two photodiodes, one sensitive to IR and the other sensitive to both IR and visible light. The IR LED and the IR photodiode are configured to limit the range in which the other photodiode detects IR or visible light. This range may be preset or may be automatically set, using software running on the controller 106, to the distance between sensor and the front or back of the wash station sink when the sensor is mounted on the back or front of the sink, respectively. In this configuration, the sensor will not detect spurious IR radiation from outside the sink. The proximity detection includes a proximity offset register to compensate the optical system for crosstalk between the IR LED and the photosensors. Furthermore, to reduce false proximity measurement readings, the sensor includes a proximity saturation bit signal that may be used to indicate that the internal analog circuitry has reached saturation.

Each of the sensors may include filters that detect only the range of IR wavelengths emitted by human skin. These wavelengths may be, for example, between 8 μm and 11 μm.

Figure 4B:
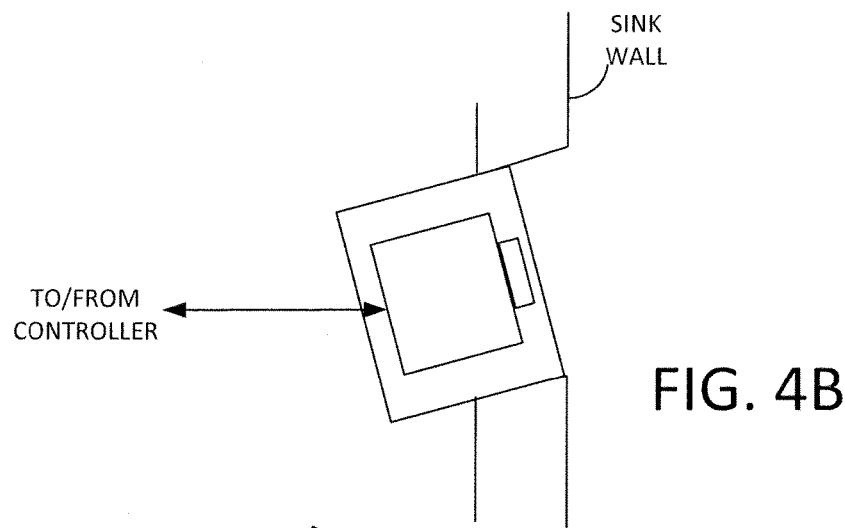

FIG. 4B is a block diagram of a different wash sensor 104'. Although the sensor 104' is shown without the sleeve 406, it may be structurally the same as the sensor 104 shown in FIG. 4A. Sensor 104' differs from sensor 104 in that it is mounted at an upward angle in the front wall of the sink. This upward angle may cause the center of the field of view of the motion sensor 402 to be located above the sink but below the faucet, where workers are most likely to position their hands during a washing operation.

Figure 4C:
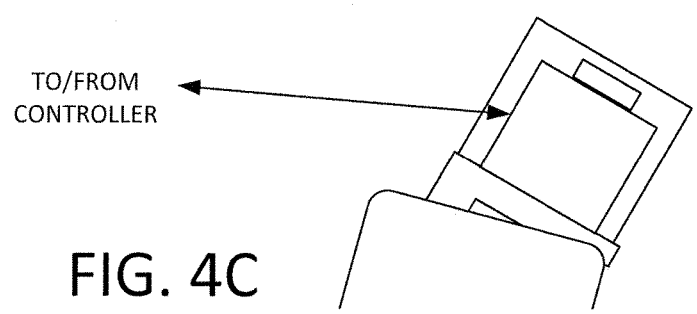
Figure 4D:
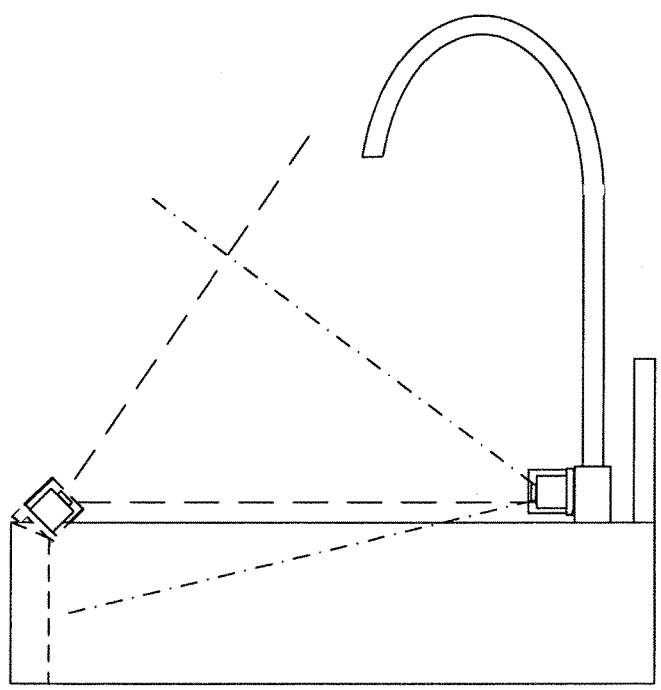

FIGS. 4C and 4D illustrate other possible wash sensors 104". These sensors may be identical to the sensors 104 and 104' shown in FIGS. 4A and 4B except that they are mounted on top of the sink at an angle such that the center of the field of view of the sensor 104" is below the outlet of the faucet 102' but above the top of the sink 100, as shown in FIG. 4D. This sensor may detect scrubbing motion in an angular range indicated by the dashed lines 406. FIGS. 4C and 4D illustrate placement of the sensor on the top of the front rim of the sink, it does not show a housing for the sensor. It is contemplated that the sensor, mounted in this location may benefit from having a more robust housing that protects the sensor against inadvertent jolts.

As shown in FIG. 4D, it is contemplated that the sensor 104" may be mounted on top of the back of the sink, for example, where the faucet meets the sink. This sensor may be mounted to sense motion in an angular range indicated by the lines 408 having alternating dashes and dots.

Although the described examples show the sensor as being mounted to the sink, it is contemplated that it may be mounted on the backsplash 101 or on the wall behind the backsplash. The field of view of the sensor is near the sink, desirably below the faucet outlet and in or above the sink.

Figure 5A:
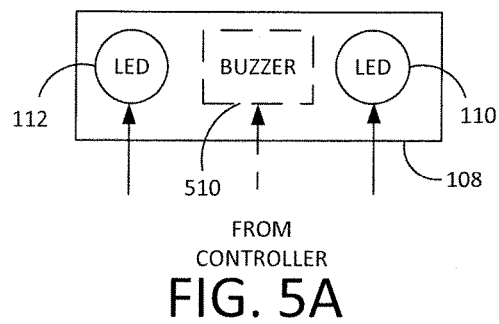
FIGS. 5A and 5B are block diagrams of display modules suitable for use with the system shown in FIG. 1.
Figure 5B:
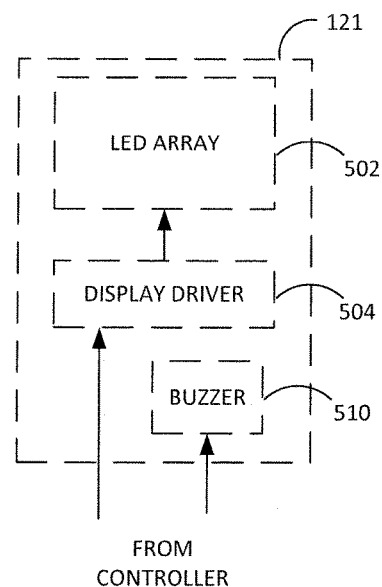

FIGS. 5A, 5B and 6 illustrate two example displays that may be used with the system shown in FIG. 1. FIG. 5A shows a simple two-LED display 108 that is shown in the system of FIG. 1. This display includes a wash LED 112 and a rinse LED 110 and an optional buzzer 510. As described above, the LEDs 110 and 112 may be single-color or multi-color LEDs. Each of these LEDs and the optional buzzer 510 is controlled by the controller 106. The controller 106 lights the wash LED to prompt the workers to scrub their hands vigorously. This LED remains lighted for an appropriate amount of time, 10 to 30 seconds, 15 to 25 seconds or 20 seconds for example, to ensure a proper hand-washing operation. The controller 106 may include an internal timer (not shown) to count-down this interval. If a scrubbing motion is not detected at any point during this interval, the controller 106 stops the timer and causes the wash LED 112 to blink and/or change color (e.g. from yellow to red) and sound the buzzer 510 until scrubbing is again detected. If scrubbing does not resume within a suitable pause period, for example 1 to 10 seconds, the controller 106 records the hand-washing operation as a failure and reports the failure to the remote computer. The controller may turn off the wash LED 112 or change its color (e.g. from yellow to green) after a satisfactory hand-washing operation. The controller may then turn on the rinse LED 110. The controller turns off rinse LED 110 (or changes its color from yellow to green) a few seconds after the worker's hands are again detected by the wash sensor 104 as being under the faucet. If no motion is detected during the rinse interval, the controller may cause the rinse LED 110 to blink and/or change its color (e.g. from yellow to red) and may sound the buzzer 510.

Figure 6B:
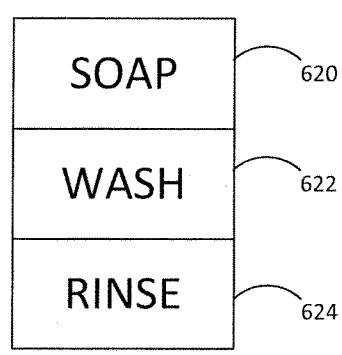
FIGS. 6A and 6B are display diagrams showing an example display sequence that may be displayed using the display module shown in FIG. 5B.
Figure 6A:
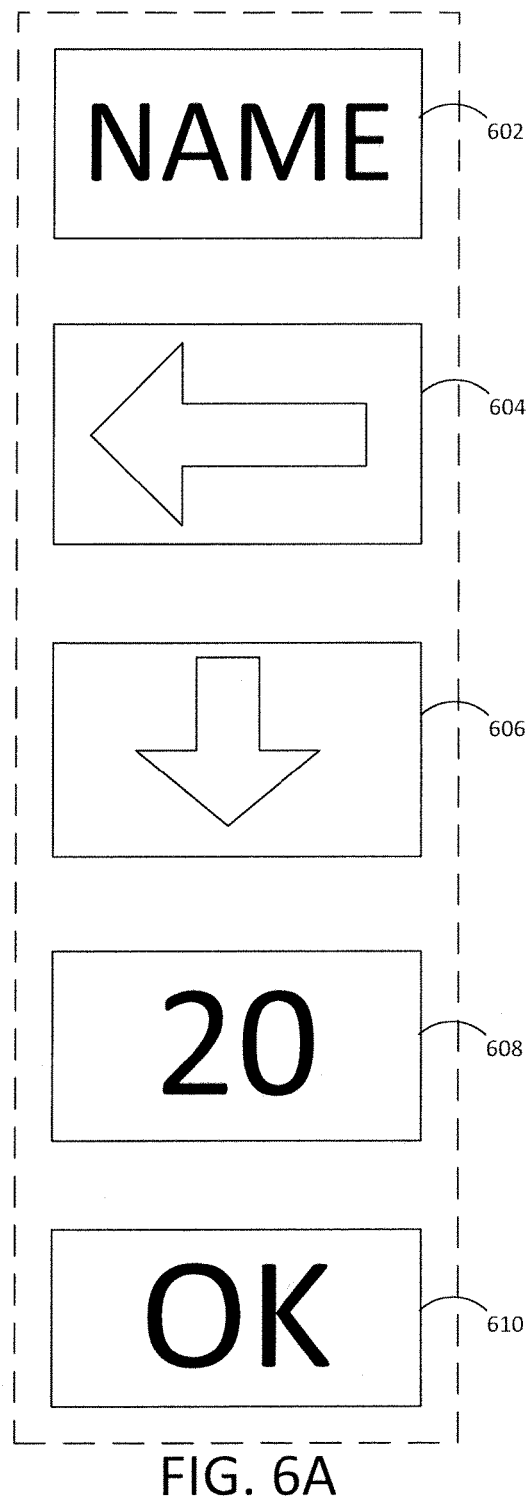

FIGS. 5B, 6A and 6B show a different type of display 121 that includes a multi-pixel display element 502 driven by a display driver 504 and the optional buzzer 502. In the example of FIG. 5B, the display element 502 may be an LED array that includes multiple rows of LEDs that may be either single-color or multi-color. It is contemplated, however, that this display may use other display techniques such as liquid crystal elements, electroluminescent elements or electronic paper display elements.

As shown at 602 of FIG. 6A, the controller 106 controls the display 121 to prompt the worker to state her name. The controller then receives signals from the microphone 126 to detect the name of the worker. Audio signals detected by the microphone 126 are processed either by the controller 106 or by the remote computer (not shown) through a voice recognition algorithm to determine the speech content of the audio signals. In one example, the microphone 126 may be replaced by a modular voice-recognition system, such as the SpeakUp speech recognition click™ board available from MikroElectronica D.O.O. Batajnič ki drum 23 11186 Zemun, Belgrade, Serbia. This system, which includes a microphone, a microcontroller and a memory, is designed to recognize worker names that have been previously input to the system by each worker stating his or her name.

After the worker has been identified, the pixel array 502 displays a left arrow 604 to prompt the worker to take soap from the soap dispenser 118. The soap dispenser sensor 114 may or may not include the LED 116. If the sensor 114 includes the LED 116, the controller may light the LED at the same time that the left arrow 604 is displayed. When the worker's hand is detected near the soap dispenser by the sensor 114, the display provided by the pixel array may change to a down arrow 606 to prompt the worker to scrub her hands. Once scrubbing motion is detected, the controller 106 and display driver 504 cause the display to count down the scrubbing time.

As described above, the PIR sensor 402 provides a signal indicating changes in ambient IR signals detected by the sensor. This signal may be filtered by the controller 106, or the controller 106 may transmit the signals to the remote computer (not shown) and the signals may be filtered there, to detect changes in the signal that are consistent with a hand-washing operation. For example, the signal may be filtered to remove any frequencies less than 0.01 Hz and greater than 1 Hz. It is contemplated that smaller or larger ranges may be used.

In this example, the scrubbing time is set to 20 seconds as shown by element 608 of FIG. 6A. As described above, with reference to the display 108, if an interruption in the scrubbing motion is detected, the display blinks at its current setting and may change color (e.g. from yellow to red) and sound the buzzer 510 until the scrubbing motion is detected again. Also, if the interruption in the scrubbing motion is too long, an error indicator (not shown) may be displayed and the failed hand-washing for the identified worker is reported to the remote computer. If the controller 106 detects the scrubbing motion throughout the proscribed scrubbing time (e.g. 20 seconds) in block 610, it causes the pixel array 502 to display "OK," possibly in green letters. After the scrubbing operation is complete, the controller 106 may cause the pixel array 502 to again display the down arrow, prompting the worker to rinse her hands.

FIG. 6B shows an alternative multi-LED display. This display may include an array of LEDs or three LEDs. In this display, the top LED 620 is red and lights-up to prompt the worker to apply soap. It stays lighted for 10 seconds or until motion is detected at the soap dispenser. If no motion is detected within 10 seconds, the LED 620 flashes on and off and the buzzer 520 sounds. Once soap is applied, the yellow wash LED 622 lights-up. This LED stays lighted for 20 seconds as long as scrubbing motion is detected by the sensor 104, 104' or 104". If there is a break in the scrubbing motion, LED 622 flashes on and off and the buzzer 520 sounds until the scrubbing motion is again detected. After a successful scrubbing operation, the LED 624 lights-up to prompt the user to rinse.

Figure 7A:
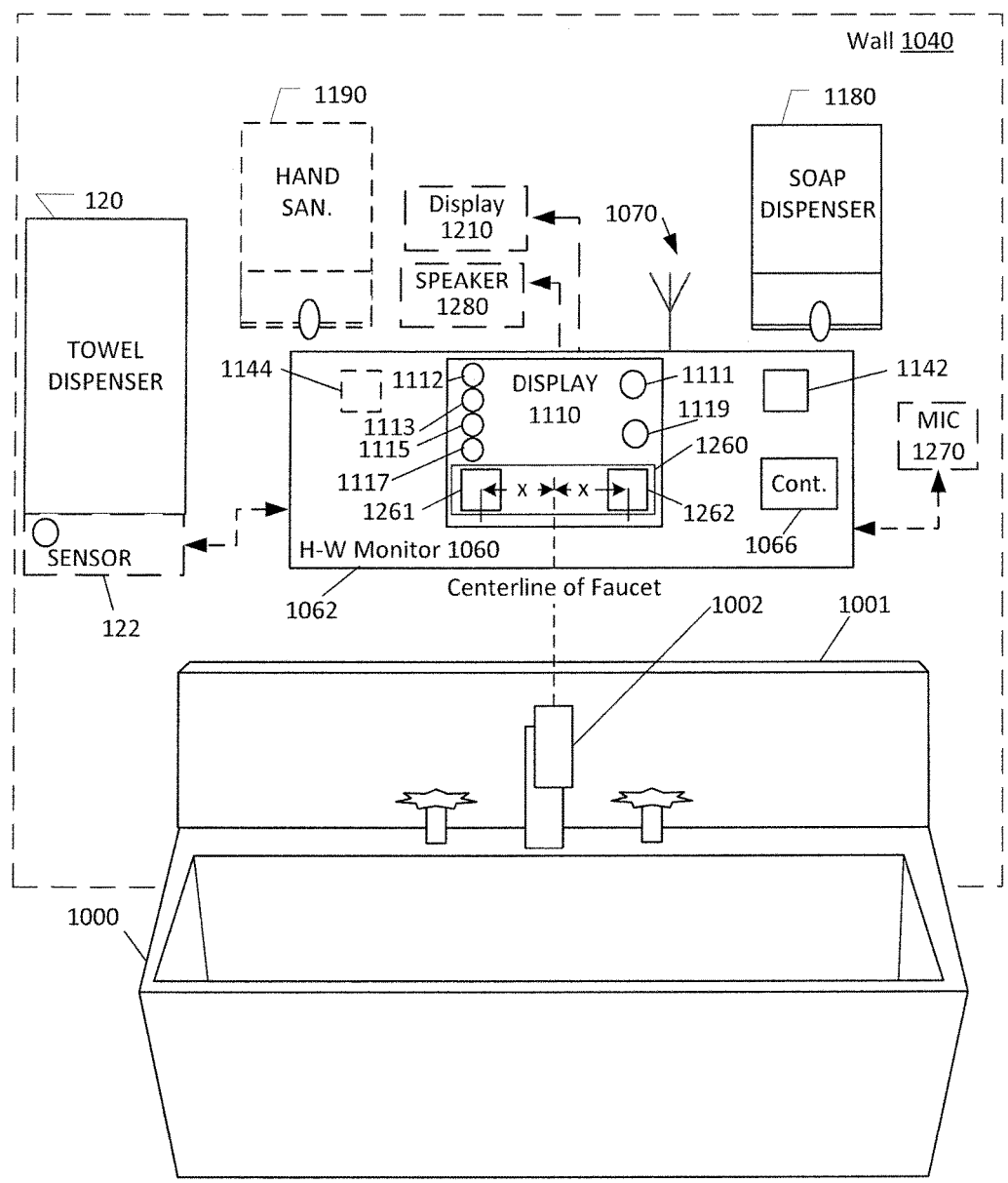
FIG. 7A is a block diagram, partly in perspective, of a sink in a food preparation establishment that includes a second example of a hand-washing monitoring system.

FIG. 7A is a block diagram, partly in perspective, of a sink in a food preparation establishment that includes a second example of a hand-washing monitoring system. The example of the hand-washing monitoring system is used in a similar food preparation environment as the station in FIG. 1. For example, the sink 1000, the backsplash 1001 and a faucet 1002 are similar to the sink 100 in FIG. 1, except that the sink 1000 of FIG. 7A does not include the motion sensor 104.

In contrast to the system of FIG. 1, the hand-washing monitor 1060 contains at least one proximity sensor 1142 and/or 1144, indicator lights 1111, 1112, 1113, 1115 and 1117 of the display 1110, controller 1066, and motion detector elements 1261 and 1262 within a housing 1062. For example, the hand-washing (H-W) monitor 1060 is mountable to a wall 1040 or other surface of a food preparation area using Velcro®, screws, nails, hooks, tape, adhesives or other mounting devices or methods.

The hand-washing monitor 1060 may include a housing 1062, a motion detector 1260, at least one proximity sensor, such as 1142, 1144 or both, a display 1110, and a controller 1066. The housing 1062 may, for example, contain the controller 1066, the first and second proximity sensors 1142 and 1144, the motion detector 1260 and the display device 1110.

The display device 1110 includes the indicator lights 1111 (e.g., "Re-Wash"), 1112 (e.g., "wet hands first"), 1113 (e.g., "Apply Soap"), 1115 (e.g., "Wash Hands"), 1117 (e.g., "Rinse Hands") and 1119 (e.g., a positive message, such as "Great Job" or the like) that are controlled by controller 1066 to prompt a user in the performance of a proper hand-washing sequence and technique. The indicator lights 1112, 1113, 1115 and 1117 may be used to prompt a user in the hand-washing sequence and technique. For example, the "wet hands first" indicator 1112 may light and remain lit until hands are detected in a detection area. When the proper hand washing sequence ends, the indicator light 1112 may light again and remain lit until another hand washing sequence begins. While indicator light 1111 may indicate to the user that the hand-washing sequence and/or technique was unsuccessful, indicator light 1119 may provide positive reinforcement to the user by indicating to the user the hand-washing technique and followed the hand-washing sequence were successfully performed. The indicator lights 1111, 1112, 1113, 1115, 1117 and 1119 may be similarly colors, different colors or multi-colored LEDs.

The motion detector 1260 may include an emitter such as 1261 and a receiver such as 1262. The emitter 1261 may be located on a first side of the faucet 1002, and the receiver 1262 may be located on a second side of the faucet 1002 (opposite the emitter 1261). The emitter 1261 is configured to emit infrared light toward an area, such as hand detection area 1220 of FIG. 7B in front of the faucet where the hand scrubbing motion is to take place. The emitter 1261 is configured to emit an infrared light beam toward the hand detection area 1220, which is in the field of view of the receiver 1262. For example, the motion detector 1260 is configured to detect, based on the reflections of the infrared light emitted by the emitter, from hands and/or a scrubbing motion in the detection area 1220 of FIG. 7B. For example, when the motion detector 1260 is centered over the centerline of the faucet 1002, the emitter 1261 is approximately a horizontal distance X from the centerline of the faucet 1002 and the receiver 1262 is also approximately a horizontal distance X from the centerline of the faucet 1002. With the emitter 1261 and the receiver 1262 aligned as described above, the infrared light emitted by the emitter 1261 is directed into the field of view of the receiver 1262 such that any reflections from object, such as a hand, are detectable by the receiver 1262. The receiver 1262 is configured to detect infrared light reflections from the hand detection area, and generate signals indicative of a scrubbing motion in the hand detection area.

The receiver 1262 may be positioned to detect infrared signals indicative of continuous scrubbing motion that occurs in the area (e.g., 1220 of FIG. 7B) in front of the faucet 1002. In more detail, the receiver 1262 is configured to detect reflections of the infrared beam emitted by the emitter 1261 that are indicative of the heat and motion due to in the hand detection area, such as 1220. A continuous scrubbing motion by a user may result in reflections of the infrared beam indicative of heat and motion. The relationship between the emitter 1261 and the receiver 1262 may be summarized such that the infrared beam output from the emitter 1261 intersects an area that is observed by the receiver 1261.

The motion detector 1260 generates signals indicating the presence or absence of a user's hands performing scrubbing motion that are provided to the controller 1066 of the hand-washing monitor 1060. The controller 1066 may be configured similar to the example of controller 106 as shown in FIG. 3. The controller 1066 also may perform functions similar to those performed by the controller 106. For example, the controller 1066 may include a processor that is coupled to a memory. The memory may store program instructions that when executed by the processor configure the controller 1066 to perform functions. In an example, the controller 1066 monitors the motion detector 1260 for signals indicative of the scrubbing motion that is continuous during a predetermined scrubbing interval (as described with respect to other examples) in the hand detection area. The controller 1066 provides a first output signal when the scrubbing motion is continuously detected during the entire predetermined scrubbing interval. The first output signal may be to one or more of the indicator lights 1111-1119 of the display device 1110.

The controller 1066 is also coupled to provide signals to a display 1110, to a transceiver that transmits data to a remote location using an antenna 1070, and to receive signals from the at least one proximity sensor 1142 located, for example, near a soap dispenser 1180. As shown in FIG. 7A, the hand-washing monitor 1060 may also be coupled to: a towel dispenser sensor 122 located near a towel dispenser 120, an optional microphone 126, an optional speaker 128. and an optional screen-type display 1210. The proximity sensor 1144 may be in proximity to an optional hand sanitizer dispenser 1190. These devices are shown in phantom as they are optional.

Figure 7B:
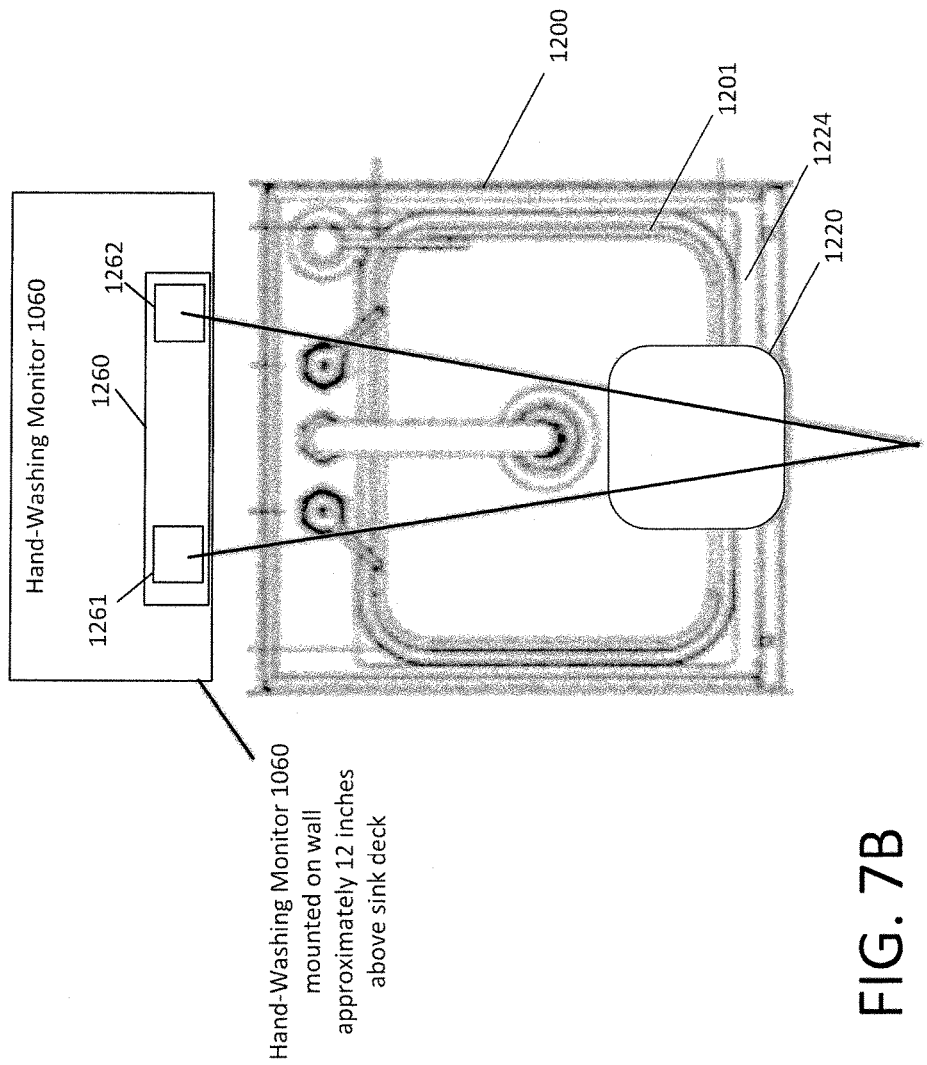
FIG. 7B is an overhead plan view of a sink in a food preparation establishment including the hand-washing monitoring system of FIG. 7A that illustrates the field of view of motion sensors of the hand-washing monitoring system of FIG. 7A.

The hand-washing monitor 1060 may be mounted to the wall 1040 approximately 12 inches above the sink deck 1224 of sink 100A as shown the example of FIG. 7B. FIG. 7B also shows examples of the arrangement of the hand-washing monitor with respect to a sink and faucet. For example, the minimum sink length from the wall to the front edge of the sink may be approximately 14 inches, the maximum sink length from the wall to the front edge of the sink may be approximately 14 inches, and a person may be detected outside the front edge of the sink up to approximately 8 inches. The hand detection area 1220 is approximately 12 inches in diameter and may centered on the faucet 1002 centerline, is a minimum of approximately 12 inches in the vertical direction from the sink deck 1224 (e.g., in the direction extending out of the page toward a viewer), and may be a minimum of 6 inches from the outside edge 1201 of the sink 1200 into the sink 1200.

As described below, the controller 106 of FIG. 1 controls the display 108, soap dispenser 118 and sensor 104 to implement a prompt to a worker to perform a sequence of steps and monitor the performance of those steps to implement a hand-washing operation. Examples of hand-washing operations are shown in FIGS. 8A, 8B, 9A and 9B.

At block 702 of FIG. 8A, the process begins when the controller 106 detects hands in the sink 100 using one of the motion sensors 104, 104' or 104". To ensure that the detection is not a spurious event, the controller, at block 704, may monitor the motion sensor for presence of the hands for a dwell time, for example, of 1 to 3 seconds, 0.5 to 5 seconds, 0.5 to 2.5 seconds or the like. This block may not be needed if the motion sensor includes a range finder, as described above. Once the dwell timer has expired, control transfers to block 706 in which the controller, using the optional display 121 or the speaker 128 may prompt the worker to provide identifying information. In a more specific example, the worker may state her name, which is received, for example, via the microphone 126 of FIG. 1, and recognized by the controller 106 or by the remote computer, running a voice-recognition algorithm. It is contemplated, however, that other types of biometric identification may be used, such as fingerprint detection, facial detection, iris recognition or retina scan. Alternatively non-biometric methods may be used, such as having workers touch their names on an input device (not shown) to initiate the hand-washing operation.

When the worker is identified at block 708, the controller 106, at block 710, sets a timer that allows the worker an amount of time to apply soap. Next, at block 712, the controller lights the LED 116 or displays the left arrow on the display 121 to prompt the worker to apply soap. At block 714, the controller 106 determines whether the motion sensor 114 has detected the presence of a hand at the soap dispenser 118. If the hand is not detected, block 715 determines whether the soap timer has expired. If it has, control transfers to block 734 to record and report a failed hand-washing operation for the identified worker. If, at block 715, the soap timer has not expired, the controller repeats blocks 712 and 714 until the application of soap is detected.

Next, at block 716, the controller 106 sets the wash timer and prompts the worker to scrub her hands. At block 718 the controller checks the signal from the motion sensor 104, 104' or 104" to determine whether the worker is scrubbing her hands. If no motion is detected, block 719 determines whether the wash timer has expired. If it has, the controller 106 records and reports a failed hand-washing operation for the worker at block 734. If the wash timer has not expired, the controller 106 repeats block 718 until motion is detected or the timer expires.

When motion is detected blocks 720 and 722 continually monitor the motion detector 104, 104' or 104" to detect intervals in which the scrubbing motion is interrupted. If continuous scrubbing motion is detected until the wash timer expires, the system, at block 724, prompts the worker to rinse and dry her hands and reports a successful hand-washing operation for the identified worker.

If an interruption, or gap, is detected, block 726 pauses the wash timer, sets an interruption or gap timer that determines the length of an acceptable interruption (e.g. less than one second, or 2 to 10 seconds) and causes the wash display to flash. The length of the acceptable interruption may also be referred to as a predetermined gap interval. The predetermined gap interval may be similar to the length of the acceptable interruption. Next block 728 determines whether scrubbing has resumed and, if it has, the wash timer is restarted at block 730 and blocks 720 and 722 are repeated until the timer expires without any unacceptable interruptions, or gaps in the hand-washing sequence.

If, at block 728, scrubbing motion is not detected, block 732 determines whether the interruption timer has expired. If it has, a failed hand-washing operation is recorded and reported at block 734. If the interruption timer has not expired at block 732, blocks 728 and 732 are executed until the timer expires or scrubbing resumes.

In the method described with reference to FIG. 8A, the controller 106 monitors only the washing operation. It does not determine whether the worker has rinsed and dried her hands. A system that monitors the rinsing and drying operation replaces block 724 of FIG. 8A with the flow-chart shown in FIG. 8B. In this system, when a successful washing operation is detected, the controller 106 executes block 750 that prompts the worker to rinse and sets a rinse timer. At block 752, the controller 106 then determines whether a scrubbing motion consistent with the worker rinsing her hands is detected by the motion sensor 104, 104' or 104". If no scrubbing motion is detected, the controller repeats blocks 752 and 760 until the rinsing motion is detected or the timer expires.

Once the rinsing motion is detected, the controller 106 prompts the user to dry her hands and sets a dry timer. This prompt may involve displaying a prompt, such as the word "DRY" (not shown) on the display 121 or it may involve lighting the LED 124 in the towel dispenser sensor 122. At block 756, the controller 106 then determines whether motion is detected by the towel dispenser sensor 122. If no motion is detected, the controller repeats blocks 756 and 764 until the rinsing motion is detected or the timer expires. When motion is detected by the towel dispenser sensor 122, the controller records and reports a successful hand-washing operation at block 758.

If, at block 760 or 764, no motion is detected when the timer expires, the system records and reports a failed hand-washing operation at block 762. It is contemplated, however, that at block 762, rather than reporting a failed hand-washing operation, the controller may record and report the washing operation as being successful but report a failed rinsing or drying operation, as appropriate.

As described above, the employer may be required to ensure that its workers wash their hands several times during a shift and/or immediately after an event, such as using the toilet or returning from a break. In one example, the schedule for each worker may be maintained by the controller 106. In another example, it may be maintained by the remote computer and the controller may be notified when a particular worker is due for a hand-washing procedure. Upon receiving this notification, the controller 106 may display information about the particular worker, for example, her name or employee ID number on the display 121 or, alternatively, may announce the name of the employee using the optional speaker 128. It is contemplated that the controller 106 may use other methods, such as a short-range radio transmission to a headset or a text message to the worker's mobile device to remind the worker that the washing operation is due.

FIG. 9A is a flow-chart diagram that shows a sequence of operations when the worker wets her hands before applying soap and FIG. 9B shows a similar sequence of operations when the worker does not wet her hands before applying soap. These flowcharts describe a system that uses the optional buzzer 510 in the display 108 or 121 and that uses multi-color LEDs in the displays and, optionally, in the soap and towel dispenser sensors. These flow-charts are self-explanatory.

Figure 10A:
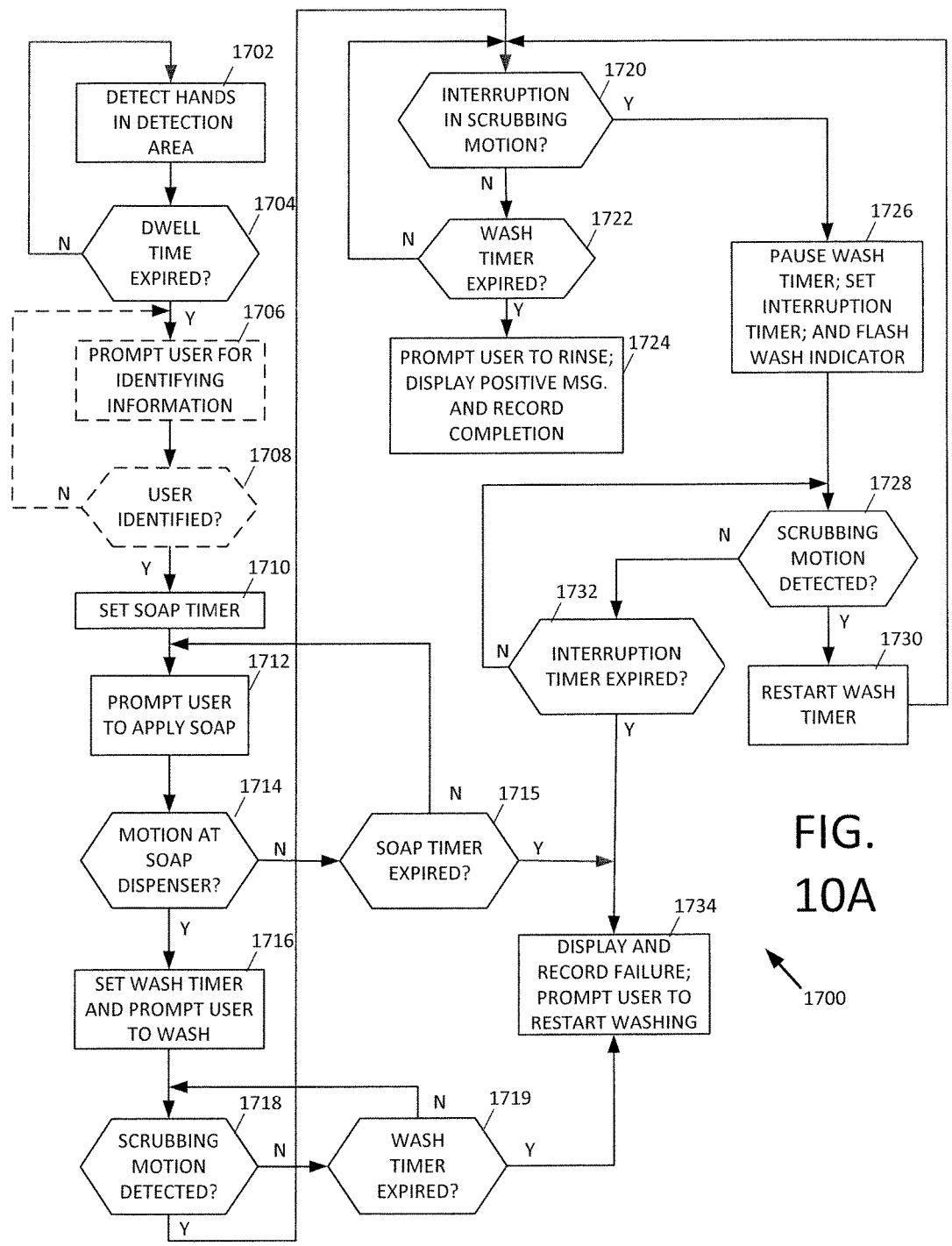
FIGS. 10A and 10B are flow-chart diagrams that are useful for describing the operation of the examples of a hand-washing monitor such as those shown in FIGS. 7A and 7B.
Figure 10B:
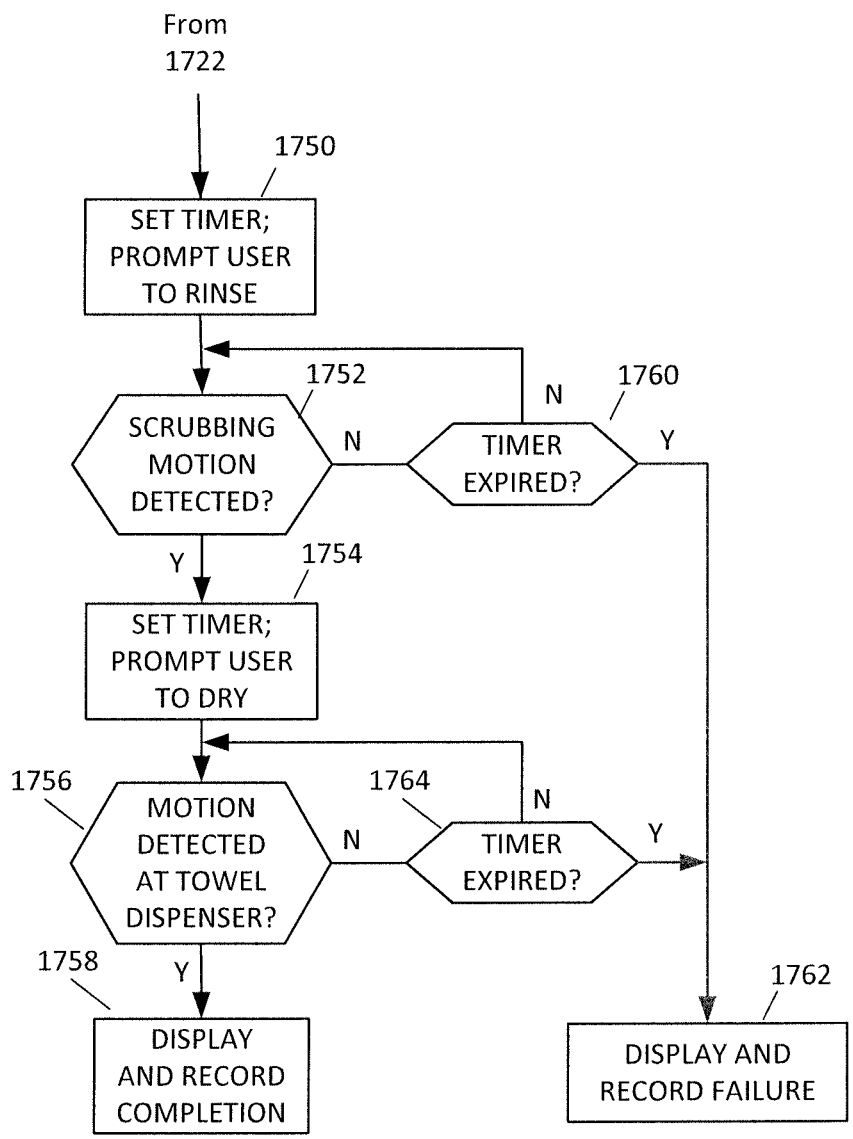

FIGS. 10A and 10B are flow-chart diagrams that are useful for describing the operation of the examples of a hand-washing monitor such as those shown in FIGS. 7A and 7B.

As described below, the controller 1066 of FIG. 7A controls the display 1110, proximity sensor 1044 and the motion detector 1260 to implement a prompt to a worker to perform a hand-washing sequence and monitor the adherence of the worker to the hand-washing sequence.

At block 1702 of FIG. 10, the process begins when the controller 1066 detects hands in the sink 1000 using one of the motion detector 1260. To ensure that the detection is not a spurious event, the controller 1066, at block 1704, may monitor the motion detector 1260 for the presence of the hands for a dwell time, for example, of 1 to 3 seconds, 0.5 to 5 seconds, 0.5 to 4 seconds or the like. Once the dwell timer has expired, the process 1700 may optional transfers to block 1706 in which the controller 1066, using the optional display 1210 or the speaker 1280 may prompt the worker to provide identifying information. In a more particular example, the worker may state her name, which is received, for example, via the microphone 1260 of FIG. 7A, and recognized by the controller 1066—or by a remote computer, running a voice-recognition algorithm. It is contemplated, however, that other types of biometric identification may be used, such as fingerprint detection, facial detection, iris recognition or retina scan. Alternatively non-biometric methods may be used, such as having workers touch their names on an input device (not shown) to initiate the hand-washing operation, swiping a badge near a radio frequency identification (RFID) device, or the like.

When the worker is identified at optional block 1708, the controller 1066, at block 1710, sets a soap timer that allows the worker an amount of time to apply soap. Next, at block 1712, the controller lights the LED 1113 or displays, for example, a right arrow on the display 1210 to prompt the worker to apply soap. At block 1714, the controller 1066 determines whether the proximity sensor 1144 has detected the presence of a hand in the proximity of the soap dispenser 1180. If the hand is not detected, block 1715 determines whether the soap timer has expired. If it has, control transfers to block 1734 to record and report a failed hand-washing operation for the identified worker. If, at block 1715, the soap timer has not expired, the controller repeats blocks 1712 and 1714 until the application of soap is detected.

Next, at block 1716, the controller 1066 sets the wash timer and prompts the worker to scrub her hands. At block 1718 the controller checks the signal from the motion 1260 to determine whether the worker is scrubbing her hands. If no motion is detected, block 1719 determines whether the wash timer has expired. If it has, the controller 1066 records and reports a failed hand-washing operation for the worker at block 1734. If the wash timer has not expired, the controller 1066 repeats block 1718 until motion is detected or the timer expires.

When motion is detected blocks 1720 and 1722 continually monitor the motion detector 1260 to detect intervals in which the scrubbing motion is interrupted. If continuous scrubbing motion is detected until the wash timer expires, the system, at block 1724, prompts the worker to rinse and dry her hands and reports a successful hand-washing operation for the identified worker.

If an interruption, or gap, is detected, block 1726 pauses the wash timer, sets an interruption or gap timer that determines the length of an acceptable interruption (e.g. less than one second, 2 to 10 seconds, or the like) and causes the wash display to flash. The length of the acceptable interruption may also be referred to as a predetermined gap interval. The predetermined gap interval may be similar to the length of the acceptable interruption. Next block 1728 determines whether scrubbing has resumed and, if it has, the wash timer is restarted at block 1730 and blocks 1720 and 1722 are repeated until the timer expires without any unacceptable interruptions, or gaps in the hand-washing sequence.

If, at block 1728, scrubbing motion is not detected, block 1732 determines whether the interruption timer has expired. If it has, a failed hand-washing operation is recorded and reported at block 1734. If the interruption timer has not expired at block 1732, blocks 1728 and 1732 are executed until the timer expires or scrubbing resumes.

In the method described with reference to FIG. 10, the controller 1066 monitors only the washing operation. It does not determine whether the worker has rinsed and dried her hands. A system that monitors the rinsing and drying operation replaces block 1724 of FIG. 10A with the flow-chart shown in FIG. 10B, which was described above. In this system, when a successful washing operation is detected, the controller 1066 executes block 1750 that prompts the worker to rinse and sets a rinse timer. At block 1752, the controller 1066 then determines whether a scrubbing motion consistent with the worker rinsing her hands is detected by the motion sensor 1260. If no scrubbing motion is detected, the controller repeats blocks 1752 and 1760 until the rinsing motion is detected or the timer expires. At which time, a positive message (e.g., "good job") indicator light, such as 1119 of FIG. 7A may be illuminated to provide positive feedback to the user.

Once the rinsing motion is detected, the controller 1066 prompts the user to dry her hands and sets a dry timer. This prompt may involve displaying a prompt, such as the word "DRY" (not shown) on the display 1210 or it may involve lighting an LED (not shown in this example) in the towel dispenser sensor 1220. At block 1756, the controller 1066 then determines whether motion is detected by the towel dispenser sensor 1220. If no motion is detected, the controller repeats blocks 1756 and 1764 until the rinsing motion is detected or the timer expires. When motion is detected by the towel dispenser sensor 1220, the controller records and reports a successful hand-washing operation at block 1758.

If, at block 1760 or 1764, no motion is detected when the timer expires, the system records and reports a failed hand-washing operation at block 1762. It is contemplated, however, that at block 1762, rather than reporting a failed hand-washing operation, the controller 1066 may record and report the washing operation as being successful but report a failed rinsing or drying operation, as appropriate.

Although the system and method are illustrated and described herein with reference to specific examples, neither the system nor the method is intended to be limited to the details shown. Rather, various modifications may be made in the details within the scope and range of equivalents of the claims.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

What is claimed:

1. A hand-washing monitoring system for use with a sink comprising:
   a motion detector mounted proximate to a top surface of the sink and configured to detect a scrubbing motion at a location near an outlet of a faucet of the sink;
   a processor coupled to the motion detector; and
   a memory coupled to the processor, the memory including program instructions that when executed by the processor cause the processor to:
   monitor the motion detector for signals indicative of the scrubbing motion that is continuous during a predetermined scrubbing interval;
   provide a first output signal when the scrubbing motion is continuously detected during the entire interval;
   monitor the motion detector for signals indicative of the scrubbing motion that is interrupted during the predetermined scrubbing interval, wherein
   (i) the scrubbing motion is acceptably interrupted when there is a break in the scrubbing motion for less than or equal to an acceptable interruption time, (ii) the scrubbing motion is interrupted with a first warning comprising at least one of a buzzer and a light, the light configured to adjust at least one of a color and a pattern, when there is a break in the scrubbing motion for less than or equal to an extended interruption time that is greater than the acceptable interruption time, and (iii) the scrubbing motion is failed when there is a break in the scrubbing motion for more than the extended interruption time;

provide a second output signal when the scrubbing motion is acceptably interrupted during the entire interval including during the break in the scrubbing motion for less than or equal to an acceptable interruption time;

provide a third output signal when the scrubbing motion is interrupted with the first warning during the break in the scrubbing motion for less than or equal to the extended interruption time;

provide a system reset with a second warning comprising the light configured to adjust at least one of a color and a pattern when the scrubbing motion is detected before the extended interruption time expires and after being interrupted with the first warning for less than or equal to the extended interruption time, wherein the first warning ceases; and provide a failed handwashing signal and a system reset without the second warning when the scrubbing motion is failed, wherein the first warning ceases.

2. The hand washing monitoring system of claim 1, wherein the scrubbing interval is between 15 seconds and 40 seconds.

3. The hand washing monitoring system of claim 1, wherein:

the motion detector includes a pair of pyroelectric infrared (PIR) motion detectors that are configured to detect the scrubbing motion by detecting changes in IR signals having frequencies consistent with the scrubbing motion, such that each PIR motion detector is configured to detect different levels of IR radiation caused by a motion of scrubbing hands at different times from one another such that the motion detector receives an amplified difference between the signals from the pair of PIR motion detectors as the first output signal as a time-varying output signal.

4. The hand washing monitoring system of claim 2, wherein the infrared optical system includes a Fresnel lens configured to have a predetermined field of view that encompasses an area beneath the faucet outlet and extending into the sink.

5. The hand washing monitoring system of claim 1 wherein the sink further comprises a faucet and the program instructions further cause the processor to monitor the motion detector for signals indicative of an object moving under the faucet after the predetermined scrubbing interval and before providing the first output signal.

6. The hand washing monitoring system of claim 5 further comprising:

a proximity detector mounted proximate to a soap dispenser;

wherein the program instructions when executed by the processor further cause the processor to monitor the proximity detector for signals indicative of application of soap to an object prior to monitoring the motion detector for the signals indicative of the scrubbing motion.

7. The hand washing monitoring system of claim 6, wherein the proximity detector mounted proximate to the soap dispenser is positioned farther away from the faucet than the motion detector.

8. The hand washing monitoring system of claim 6, further comprising:

a further proximity detector mounted proximate to a towel dispenser;

wherein the program instructions when executed by the processor further cause the processor to monitor the further proximity detector for signals indicative of the dispensing of a towel, after monitoring the motion detector for the signals indicative of the object moving under the faucet and before providing the first output signal.

9. The hand washing monitoring system of claim 8, further comprising:

at least one display device coupled to the processor;

wherein the program instructions when executed by the processor further cause the processor to control the display device to:

display a first prompt a user to place the user's hands under the soap dispenser before monitoring proximity detector;

display a second prompt the user to scrub the user's hands in the sink before monitoring the proximity detector for the signals indicative of the scrubbing motion;

display a third prompt the user to place the user's hands under the faucet before monitoring the motion detector for the signals indicative of the object moving under the faucet; and display a fourth prompt the user to take a towel from the towel dispenser before monitoring the further proximity detector for signals indicative of the dispensing of the towel.

10. The hand washing monitoring system of claim 8, wherein the program instructions when executed by the processor further cause the processor to display an indication of a non-compliant hand washing when:

the processor does not detect the signals indicative of the application of the soap to the object after a first predetermined time following the display of the first prompt;

the processor does not detect the signals indicative of the scrubbing motion after a second predetermined time following the display of the second prompt;

the processor does not detect the signals indicative of the object moving under the faucet after a third predetermined time following the third prompt; or the processor does not detect the signals indicative of the dispensing of the towel after a third predetermined time following the display of the fourth prompt.

11. The hand washing monitoring system of claim 1, wherein the program instructions when executed by the processor cause the processor to delay the detection of the scrubbing motion for a predetermined dwell interval following detection of motion by the motion detector.

12. The hand washing monitoring system of claim 11, wherein the predetermined dwell interval is between 0.5 seconds and 5 seconds.

13. The hand washing monitoring system of claim 1, further including an input device for receiving biometric information to identify a user prior to beginning the handwashing operation.

14. The hand-washing monitoring system of claim 13, wherein the input device is a microphone coupled to the processor and the processor causes audio signals received from the microphone to be processed through a voice-recognition algorithm to identify the user.

15. The hand-washing monitoring system of claim 1, wherein the motion detector is mounted to the top surface of the sink.

16. The hand-washing monitoring system of claim 15, wherein the motion detector includes a rangefinder and is mounted on top of a back edge of the sink, proximate to the faucet.

17. The hand-washing monitoring system of claim 15, wherein the motion detector is mounted on top of a front edge of the sink at an angle such that a center of a field of view of the sensor is above the top of the sink and below the outlet of the faucet.

18. The hand-washing monitoring system of claim 1, wherein the motion detector is mounted through the front wall of the sink.

19. The hand-washing monitoring system of claim 1, wherein program instructions when executed by the processor further cause the processor to periodically prompt a user to perform a hand-washing operation.

20. The hand washing monitoring system of claim 1, wherein the motion detector comprises:
    an emitter located on a first side of the faucet, the emitter oriented to emit infrared light toward an area in front of the faucet where the scrubbing motion is to take place; and
    a receiver located on a second side of the faucet and positioned to detect infrared signals indicative of continuous scrubbing motion that occurs in the area in front of the faucet.

21. The hand washing monitoring system of claim 20, wherein:
    the emitter is configured to emit an infrared light beam to an area in the field of view of the receiver; and
    the receiver is configured to detect in the field of view reflections of the infrared light beam emitted by the emitter that are indicative of heat and motion of the continuous scrubbing motion in the receiver's field of view.

22. The hand washing monitoring system of claim 21, wherein the infrared light output from the emitter is modulated to be uniquely detected by the detector.

23. A hand-washing monitoring system for use with a sink having a faucet and a soap dispenser comprising:
    a motion detector mounted to the sink and configured to detect a scrubbing motion near an outlet of the faucet;
    a proximity detector mounted proximate to the soap dispenser and configured to detect application of soap to an object;
    one or more display devices;
    a processor coupled to the motion detector, the proximity detector and the one or more display devices; and
    a memory coupled to the processor, the memory including program instructions that cause the processor to:
        display, using one of the one or more display devices, a first prompt to place hands under the faucet;
        monitor the motion detector for signals indicative of the presence of the hands beneath the faucet;
        display, using one of the one or more display devices, a second prompt to apply soap to the hands;
        monitor the proximity detector for signals indicative of the application of soap to the hands;
        display, using one of the one or more display devices, a third prompt to scrub hands;
        monitor the motion detector for signals indicative of the scrubbing motion being continuous or acceptably interrupted for a predetermined interval, wherein the scrubbing motion is acceptably interrupted when there is a break in the scrubbing motion for less than or equal to an acceptable interruption time, and wherein the scrubbing motion is interrupted with a warning comprising at least one of a buzzer and a light, the light configured to adjust at least one of a color and a pattern, when there is a break in the scrubbing motion for less than or equal to an extended interruption time that is greater than the acceptable interruption time and less than a failed interruption time;
        display, using one of the one or more display devices, a fourth prompt to rinse the hands after the predetermined interval;
        monitor the motion detector for the signals indicative of the presence of the hands beneath the faucet; and
        display a fifth prompt, using one of the one or more display devices, indicating completion of the hand washing.

24. A hand-washing monitor for use in proximity to a soap dispenser and a sink having a faucet, the hand-washing monitor comprising:
    a housing;
    at least one proximity sensor;
    a motion detector including an emitter and a receiver, wherein:
        the emitter is configured to emit infrared light toward a hand detection; and
        the receiver is configured to:
            detect infrared light reflections from the hand detection area, and
            generate signals indicative of a scrubbing motion in the hand detection area;
    a controller, including a processor coupled to a memory, the memory storing program instructions that when executed by the processor configure the controller to perform functions, including functions to:
        monitor the motion detector for signals indicative of the scrubbing motion that is continuous during a predetermined scrubbing interval;
        provide a first output signal when the scrubbing motion is continuously detected during the entire predetermined scrubbing interval,
        monitor the motion detector for signals indicative of the scrubbing motion that is interrupted during the predetermined scrubbing interval, wherein
            (i) the scrubbing motion is acceptably interrupted when there is a break in the scrubbing motion for less than or equal to an acceptable interruption time,
            (ii) the scrubbing motion is interrupted with a first warning comprising at least one of a buzzer and a light, the light configured to adjust at least one of a color and a pattern, when there is a break in the scrubbing motion for less than or equal to an extended interruption time that is greater than the acceptable interruption time, and
            (iii) the scrubbing motion is failed when there is a break in the scrubbing motion for more than the extended interruption time;
        provide a second output signal when the scrubbing motion is acceptably interrupted during the entire interval including during the break in the scrubbing motion for less than or equal to an acceptable interruption time;

provide a third output signal when the scrubbing motion is interrupted with the first warning during the break in the scrubbing motion for less than or equal to the extended interruption time;

provide a system reset with a second warning comprising the light configured to adjust at least one of a color and a pattern when the scrubbing motion is detected before the extended interruption time expires and after being interrupted with the warning for less than or equal to the extended interruption time, wherein the first warning ceases; and provide a failed handwashing signal and a system reset without the second warning when the scrubbing motion is failed, wherein the first warning ceases;

wherein the housing is configured to contain the controller, the motion detector, the proximity sensor and the display device.

25. The hand-washing monitor of claim 24, wherein the housing is wall-mounted over the faucet of the sink.

* * * * *